INVENTORS
MERRILL COX
& ADOLPH L. FOELL
BY
Richey & Watts
ATTORNEYS

Patented Feb. 28, 1950

2,499,057

UNITED STATES PATENT OFFICE 2,499,057

SOLIDS CONCENTRATING METHOD AND APPARATUS

Merrill Cox, University Heights, and Adolph L. Foell, Cleveland Heights, Ohio

Application June 19, 1944, Serial No. 541,108

9 Claims. (Cl. 210—44)

This invention relates generally to the art of handling fine solids and particularly to new and improved arrangements of thickening apparatus and new and improved methods of concentrating fine solids contained in wash waters such as those from blast furnace scrubbers or ore beneficiation plants.

The gases which flow from the top of the blast furnace and carry quantities of fine solids or dust are used to heat the checkers of blast furnace stoves or are burned under boilers or in gas engines. However, the solids or dust contained in these gases must be removed before the gases can be employed for any of these uses, and such solids are customarily removed by scrubbing the gases with water. Since the dust consists mainly of iron ore, which is valuable, it is economically sound practice to recover as much of the dust as is possible. Additionally, since the laws in many parts of the country prevent the liberation of scrubber water containing more than about ten grains of solids per gallon into streams and lakes, it is often necessary to remove the blast furnace dust for this additional reason.

In some steel plants, thickeners of a suitable size, together with the necessary filters, were located at or near the furnaces. Such an arrangement required space for the filters and also required that the filter cake which contained from about 20% to about 30% of water be transported to another point in the plant for further processing and the handling incident to such transportation was difficult especially in cold weather when the water in the filter cake would freeze.

In other instances, a suitable thickener was located at or near to a furnace and the filters were located at some remote point, for example, adjacent to a sintering plant at some distance from the furnace. The sludge from the thickener, containing from about 40% to about 60% of solids, was pumped to the filter during periods of about one to one and a half hours two or three times in 24 hours operation of the thickener. After each such pumping operation the pipe lines had to be washed out so that they would not be plugged by solids settling out of the sludge and adhering to the pipe. When such plugging occurred the pipe lines often had to be dismantled to clean out the solids. This method and apparatus required considerable attention and labor, for if the solids content exceeded about 70% the sludge could not be pumped and caused great difficulty at the thickener.

In still other instances, the thickener and filters were located at a point remote from the furnace and usually adjacent to the sintering machine. Such an arrangement required that the full volume of scrubber water be flumed or pumped thru the intervening distance. Altho the scrubber water contained a small percentage of solids, those solids frequently deposited in the flume or pipes and built up therein. Furthermore, this method and apparatus was costly to build and maintain, was rather impractical to use, and was expensive to operate because of the large volumes of water to be pumped. Part of the expense of installation was traceable to the fact that a separate pipe line was required from each furnace to the thickener or, when a single pipe line was employed, the diameter had to be increased when lines from additional furnaces entered it. When a separate pipe line led from each furnace to the remote thickener the expense of a single line was multiplied by the number of furnaces. When a single line was used for a plurality of furnaces and the diameter of the line was increased every time the scrubber water from another furnace was brought into the line, the number of separate pipe lines was reduced but other disadvantages appeared. For example, when a single pipe line was used to carry the scrubber water from, say seven, furnaces to a remote thickener and filter, and some, say two, of the furnaces were shut down, clear water in an amount equivalent to the scrubber water normally coming from those furnaces when they were operating had to be pumped into the pipe line to maintain the minimum velocity required to keep the solids in suspension. This entailed excessive expense for pumping such water.

An unsatisfied demand has long existed for new and improved methods and arrangement of apparatus for easily and cheaply transporting a mixture of fine solids and water from its place of origin over long distances to a remote place where the solids are to be further processed, and this demand has been particularly acute in existing steel plants where space is already at a premium and the methods and apparatus for removing such dust are antiquated, inefficient, or do not comply with the demands of local laws regulating the maximum amounts of solids which may be discharged in water from the plant. So far as we know, this problem has not been satisfactorily solved heretofore altho efforts to solve it have been made by many workers in the art over a period of many years.

The present invention aims to solve this long-standing problem and achieves that aim by a new and improved method and by a new and improved system or apparatus involving a new combination of elements. This invention provides methods and apparatus which avoid the major disadvantages of prior methods and apparatus, some of which have been mentioned hereinabove, and is highly efficient, quite simple and cheap to operate and relatively inexpensive as regards installation and maintenance costs.

Broadly stated, our method invention contemplates the steps of treating a mixture of water and fine solids at or adjacent to its place of origin, for example blast furnace scrubber water, so as to obtain a semi-thickened liquid which contains a somewhat increased percentage of solids but which can readily be pumped, continuously pumping such liquid in small volume to a remote place, and further processing the solids at that place, for example, further concentrating the solids of the scrubber water into a filterable sludge and filtering such sludge.

Broadly stated, our apparatus or system invention contemplates a primary thickener located for example at or near to a blast furnace, a single main pipe line for conducting the primarily or semi-thickened liquid to a place remote therefrom, for example, near a sintering machine, continuously operating pumps for pumping the semi-thickened liquid to such remote place thru the main line, and means at that place for further processing the solids, for example, a thickener and filter.

Some of the numerous and important advantages of this invention are as follows: Attendants are required only at the final thickener. The underflow from the primary thickeners is a semi-thickened liquid which may be pumped continuously and thus the main pipe line may be much smaller than when the unthickened scrubber water from several furnaces is pumped thru one pipe line. The continuous pumping of the semi-thickened liquid avoids pipe plugging and cleaning. When another furnace associated with the same pipe line is not operating, only small amounts of clear water need be added to maintain the velocity in the line. The use of one, small diameter pipe line from several primary thickeners to a single final thickener results in savings in cost of pipe, economy of space, and greater ease and flexibility in laying the main pipe line; and also permits the use of smaller pumps which are less expensive to acquire, maintain and operate.

In the drawings accompanying and forming a part of this specification,

Figure 1:
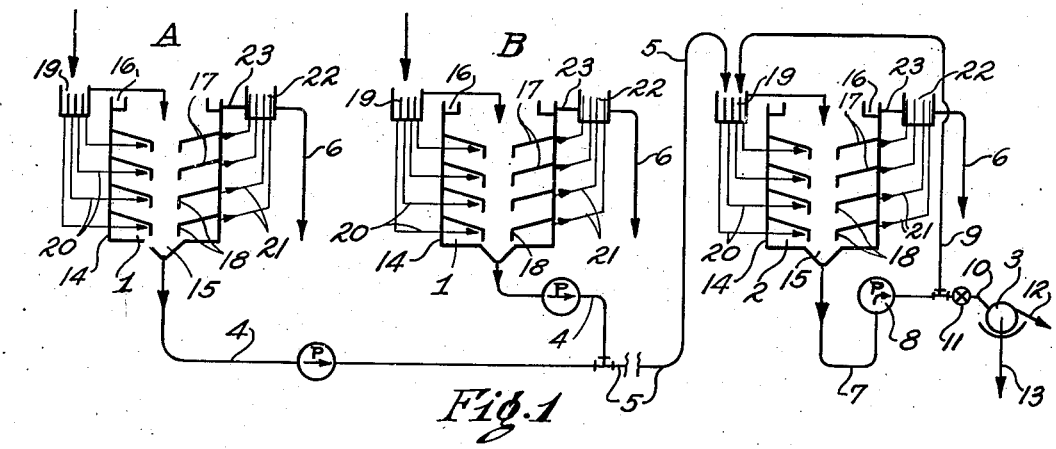
Figure 1 is a diagrammatic drawing showing one embodiment of the present invention.

Fig. 1 shows two primary thickeners 1, a final thickener 2 and a filter 3. The underflow outlet from each thickener 1 is connected thru a branch pipe line 4 to a main pipe line 5 which discharges into final thickener 2. Primary thickeners 1 are located close to blast furnaces A and B respectively and at a place remote from thickener 2. Additional primary thickeners 1, not shown but corresponding in number to additional blast furnaces, may have their underflow outlets similarly connected to main pipe line 5.

Each of the thickeners 1 has an overflow line 6 to a sewer for removing water containing permissible amounts of fine solids.

The final thickener 2 has its underflow outlet connected to a pipe line 7 provided with pump 8 and, beyond the pump, the pipe line divides into lines 9 and 10, the former serving to return sludge to the inlets of thickener 2 while the latter serves, when valve 11 therein is opened, to admit sludge to the filter 3. Filter cake from filter 3 may be removed therefrom as is indicated by line 12 for further processing, as for example, for sintering, while the filtrate from filter 3 may be discharged into a sewer thru line 13.

Any suitable conventional thickener may be used as primary thickeners 1 of this figure. One type of thickener is the familiar Dorr thickener which may be briefly described as follows: This thickener consists of a cylindrical tank 14 having a central underflow discharge opening 15 in its bottom, an overflow trough 16 around its upper open end, a plurality of vertically spaced trays 17 extending inwardly and downwardly at a slight angle from the vertical walls of tank 14 and terminating short of the center of the tank in downwardly extending cylinders 18, a feed box 19 for fluid which is to enter the thickener and inlets 20 for conducting liquids therefrom in toward the center of each of the thickening compartments. When fluid containing solids to be thickened enters the central feed wells surrounding cylinders 18 of each tray, horizontal radial lines of liquid flow are established in each compartment toward a plurality of outlets 21 for each compartment, spaced circumferentially around tank 14. The velocity of flow is such that the solids settle to the bottom of each compartment as the fluid reaches outlets 21. The outlet pipes 21 conduct the clear water to each of several overflow boxes 22 and thence thru pipe 6 to the sewer. The overflow trough 16 is connected to overflow boxes 22.

The solids retained in each of the compartments of tank 14 are raked by the revolving rake mechanism into the central cylinders 18 of each tray which form a vertical passageway for the solids to reach the central underflow discharge opening 15 of the thickener.

The operation of such a thickener, when used as a primary thickener, is indicated by the following illustrative, but not limiting, example. When about 2400 gallons per minute of water which has been used to scrub fine solids out of blast furnace gases and which contains about 190 grains of solids per gallon, is delivered into such a thickener, about 2340 gallons per minute of water containing only about 15 grains per gallon is allowed to escape thru overflow boxes 16 and 22 and pipe 6 to the sewer, and the remaining 60 gallons per minute of water will contain about 7000 grains per gallon, or about 12% of solids. This quantity of water and solids is a semi-thickened, readily pumpable liquid which is withdrawn as underflow from the thickener into branch line 4.

Figure 2:
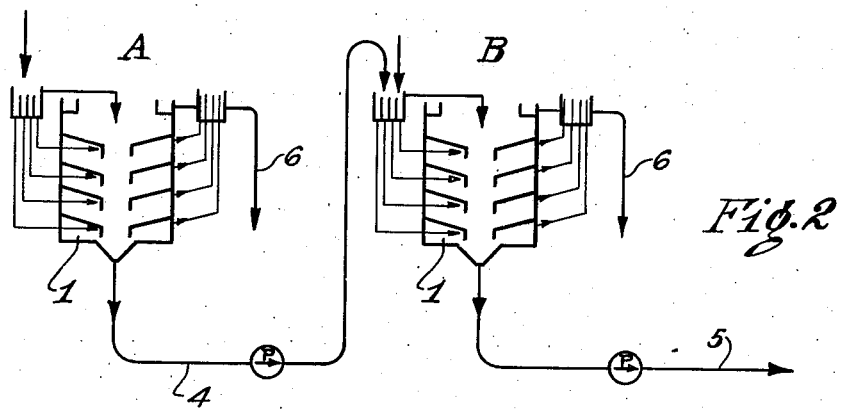
Figure 2 is a diagrammatic drawing showing a modified embodiment of the invention; and, Figure 3 is a similar drawing showing another modified embodiment of the invention.

A similar Dorr thickener has been found to be satisfactory for the final thickener 2 of Fig. 2, but for such use provision is made for recirculating the underflow therefrom thru its inlet until the content of solids therein is increased to such an extent that the sludge is filterable, that is, contains from between about 40% and about 50% of solids.

Any suitable, conventional filtering device may be used as filter 3.

The operation of the apparatus of Fig. 1 may be briefly described as follows: The gas scrubber water from blast furnace A approximating, for example, 2400 gallons per minute of water containing, for example, 190 grains of solids per gallon is delivered into the primary thickener 1 of that furnace. About 2340 gallons per minute of water containing about 15 grains of solids per gallon are discarded from that thickener thru overflow boxes 16 and 22 to sewer 6, and the remaining 60 gallons per minute, containing about 7000 grains of solids per gallon, or about 12% of solids, are pumped thru a small pipe line 4 and into pipe line 5 at such minimum velocity as is required to carry all the solids. At the same time, a similar quantity of gas scrubber water, containing a similar amount of solids per gallon, is delivered from furnace B into its primary thickener 1. About 2300 gallons per minute of water containing about 15 grains of solids per gallon are discarded from this thickener thru overflow boxes 16 and 22 and thru the sewer thru line 6. The remaining 100 gallons per minute, constituting underflow and containing about 4200 grains of solids per gallon, or about 7.2% of solids, are pumped thru the branch line 4 from that primary thickener to main pipe line 5 at a velocity rate of sufficient magnitude to carry all solids. The semi-thickened, pumpable liquids from these primary thickeners are commingled in and pumped thru pipe line 5 which is approximately 3½" in diameter and are delivered into the remote final thickener 2. These 160 gallons per minute of commingled liquid will contain about 5200 grains of solids per gallon, or about 9% of solids, and are pumped thru line 5 at a velocity sufficient to carry all solids. By keeping valve 11 closed and pumping the underflow from final thickener 2 thru pipe lines 7 and 9, that is, recirculating the underflow liquid repeatedly thru the thickener, and meanwhile removing water containing not more than about 15 grains of solids per gallon from overflow boxes 16, the pumpable liquid which is delivered into final thickener 2 may be concentrated to a thickened filterable sludge containing between an average of about 40% and an average of about 50% of solids. When such sludge has been formed by this recirculation, the valve 11 may be opened and the sludge pumped to filter 3 where all but between about 20% and about 30% of the water may be removed from the solids and such solids are fit for further processing, for example, sintering.

Altho Fig. 1 shows only two primary thickeners which, as described, respectively accommodate the gas scrubber water from two blast furnaces, it will be understood that one primary thickener may serve two or more furnaces; and also that any desired number of primary thickeners may be connected to main pipe line 5. Obviously, the size of the pipe line 5 should be increased each time the branch pipe line from another primary thickener is led thereinto so as to accommodate the semi-thickened, pumpable liquid from the added thickener. However, even if several primary thickeners are added the diameter of the main pipe will still be relatively small because of the small volume of liquid to pass thru it. If desired, separate pipe lines from each primary thickener to secondary thickener may be used.

The foregoing specific illustration, and the values stated therein, have been set forth solely for the purpose of giving a typical example of the operation of the present invention, and not at all in a limiting sense. It will be obvious to those skilled in the art that variations will occur in any steel plant, and from furnace to furnace in that plant, and from time to time in the operation of any furnace, not only in the amount of gas scrubber water delivered to a primary thickener but also in the amount of solids contained therein, and also that the amounts and percentages of solids in the underflows will vary from the figures given. In general, however, it may be said that it is preferable to maintain the solids in the underflow from the various primary thickeners at between an average of about 8% and an average of about 13% and, likewise, to maintain the solids in the commingled liquids in pipe line 5 between those average percentages, altho smaller or larger percentages may be maintained in either or both places if desired. When the solids concentration is less than about an average of 8%, more water has to be removed in the final thickener.

Figure 2 shows a modified arrangement of the apparatus of Fig. 1 and a modification of the process of operation of the apparatus of Fig. 1. These apparatus modifications essentially comprise connecting the underflow from the primary thickener of one furnace with the inlet to the primary thickener of another furnace and the omission of the branch line from the first primary thickener to the main pipe line 5.

In Fig. 2 the underflow from primary thickener 1 of furnace A is pumped thru pipe line 4 to the inlet pipe lines of primary thickener 1 of furnace B. The underflow from this latter primary thickener is pumped thru main pipe line 5 to a remotely located final thickener 2 in which the operation there and subsequently is substantially as described above in connection with Fig. 1.

The operation of the apparatus of Fig. 2 will be understood by the following illustrative, but not limiting, example in which the values used correspond to those used in connection with Fig. 1. With a delivery of 2400 gallons per minute of gas scrubber water containing 190 grains per gallon from furnace A into its thickener 1, about 2340 gallons per minute of liquid containing 15 grains of solids per gallon are discarded to the sewer, while about 60 gallons per minute containing about 7000 grains of solids per gallon, or 12% of solids, will be pumped thru pipe line 4 at a velocity rate high enough to carry all solids. This semi-thickened, pumpable liquid is delivered into the inlet pipes of the primary thickener 1 of furnace B, together with about 2400 gallons per minute of gas scrubber water from that furnace and containing about 190 grains of solids per gallon. About 2300 gallons per minute of water containing about 15 grains of solids per gallon are discarded from this second thickener 1 to the sewer. The underflow from this latter primary thickener amounts to about 160 gallons per minute, containing about 5200 grains per gallon or about 9% of solids. This underflow is pumped thru pipe line 5 at the rate of 160 gallons per minute. It will be seen that illustrative figures have been used in describing Fig. 2 which correspond with those employed for illustrative purposes only in Fig. 1, and it will be understood that the variations above mentioned in liquid quantities, in solid contents, percentages and the like, apply to Fig. 2 as well as to Fig. 1. It will also be understood that additional primary thickeners may be added to the apparatus of Fig. 2 for additional furnaces and that they may be added in pairs, thereby duplicating the arrangement of primary thickeners 1 of that figure or, if desired, the added thickeners may be connected separately into pipe line 5 after the manner shown in Fig. 1.

Figure 3:
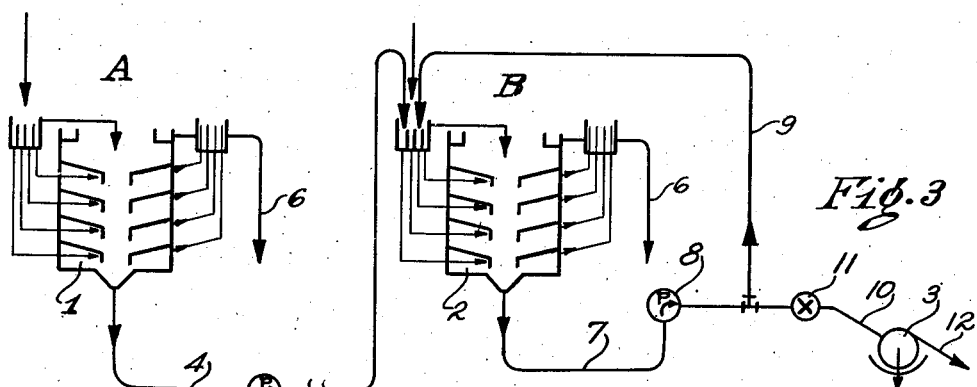

Fig. 3 shows another modification of the present invention. In this figure the underflow from primary thickener 1 of furnace A is delivered into final thickener 2 together with the gas scrubber water from a furnace B located adjacent to and served by that final thickener, and also with underflow from thickener 2 which is being recirculated thru pipe lines 7 and 9 by pump 8. As in Figs. 1 and 2, primary thickener 1 may be located remote from final thickener 2.

Again employing values similar to those in Figs. 1 and 2, the operation of this device may be described briefly as follows: About 2400 gallons per minute of gas scrubber water from furnace A containing about 190 grains of solids per gallon are delivered into primary washer 1 and about 2340 gallons per minute of water containing about 15 grains of solids per gallon are discarded from that thickener to the sewer. The underflow constituting the remaining 60 gallons per minute and containing about 7000 grains of solids per gallon, or about 12% of solids, is withdrawn and pumped thru pipe line 4 at a velocity high enough to carry all solids into the inlets of final thickener 2. At the same time about 2400 gallons per minute of gas scrubber water from furnace B and containing about 190 grains of solids per gallon is entering this final thickener 2 and the semi-thickened, pumpable liquid underflow from thickener 2 is being recirculated thru pipe lines 7 and 9 and the thickener. When the concentration of solids in the underflow from final thickener 2 amounts to between about 40% and about 50%, valve 11 is opened and such filterable sludge is pumped thru line 10 to filter 3 where all but about 20% to about 30% of the moisture is removed therefrom so as to fit it for further processing, such as sintering.

Here again it will be understood that the foregoing figures are merely illustrative and not limiting, and that the above mentioned expected variations will be present.

It will be obvious to those skilled in the art that more than one primary thickener 1 may be connected to final thickener 2 in Fig. 3 in the same manner as that illustrated, if desired; or that one or more pairs of primary thickeners 1, associated as shown in Fig. 2, may be connected to final thickener 2 of Fig. 2, if desired; or that one or more primary thickeners 1, associated with a main pipe line 5, as in Fig. 1, may be added to the apparatus of Fig. 3. If desired, the semi-thickened liquid from a plurality of primary thickeners may be delivered into two or more final thickeners, and the filterable sludge from those final thickeners may be filtered in one or more filters. Various other rearrangements and combinations of the apparatus of Figs. 1, 2 and 3 may obviously be made, all without departing from the spirit and intent of the present invention, as outlined above and set forth in the following claims.

Having thus described the invention so that others skilled in the art may be able to understand and practice the same, we state that what we desire to secure by Letters Patent is defined in what is claimed.

What is claimed is:

1. Apparatus of the class described comprising a plurality of blast furnaces, a plurality of scrubbers located adjacent to said furnaces to remove fine solids from gases received from said furnaces, a plurality of primary thickeners located adjacent said scrubbers to concentrate such solids in water from the scrubbers, each primary thickener having an inlet for water from a scrubber, an upper outlet for water substantially free from said solids and a lower outlet for water containing a concentration of such solids constituting pumpable liquid, a final thickener remote from at least one of said primary thickeners for increasing the concentration of solids to that of a filterable sludge, means including piping and a pump for conducting said pumpable liquid to the inlet of the final thickener from the said lower outlet of at least one of said primary thickeners, said final thickener having an inlet for said pumpable liquid, an upper outlet for water substantially free from said solids and a lower outlet for said filterable sludge, a filter adjacent the said final thickener and means including piping and a pump for transferring said filterable sludge from said final thickener to said filter.

2. Apparatus as described in claim 1 in which the primary thickeners are connected in parallel by said piping.

3. Apparatus as described in claim 1 in which the primary thickeners are connected in series by the said piping.

4. Apparatus as described in claim 1 in which the final thickener is also a primary thickener.

5. The method of recovering fine solids from the gases of a plurality of blast furnaces which comprises the steps of scrubbing the gases of each furnace adjacent thereto with water, continuously separating the wash water from each scrubber adjacent thereto by gravity into clarified water and semi-thickened pumpable liquid constituting about 2% of wash water and containing a solid content of from an average of about 5% to an average of about 20%, continuously pumping said pumpable liquids to a place remote from at least one of said scrubbers and there separating said liquids by gravity into clarified water and thickened, filterable sludge.

6. The method of claim 5 in which the said pumpable liquid contains about 12% of fine solids and the said filterable sludge contains about 50% of fine solids.

7. The method of claim 5 in which the said pumpable liquid contains between an average of about 5% and an average of about 20% of fine solids and the said sludge contains between an average of about 40% and an average of about 60% of fine solids.

8. The method of claim 5 in which the said filterable sludge is filtered.

9. The method of claim 5 in which the said filterable sludge is filtered, and the resulting solids are sintered.

MERRILL COX.
ADOLPH L. FOELL.

REFERENCES CITED

The following references are of record in the file of this patent:

UNITED STATES PATENTS

| Number | Name | Date |
|---|---|---|
| 708,494 | Randall | Sept. 2, 1902 |
| 889,664 | Crozier | June 2, 1908 |
| 957,775 | Holms et al. | May 10, 1910 |
| 1,210,392 | Alpenfels | Jan. 2, 1917 |
| 1,271,926 | Moore | July 9, 1918 |
| 1,283,365 | Trent et al. | Oct. 29, 1918 |
| 1,604,427 | Spicer | Oct. 26, 1926 |
| 1,678,788 | Remick | July 31, 1928 |
| 1,739,302 | Gregorich | Dec. 10, 1929 |
| 1,752,789 | Downes | Apr. 1, 1930 |
| 2,129,267 | Fischer | Sept. 6, 1938 |
| 2,149,748 | Samuel | Mar. 7, 1939 |
| 2,177,857 | Bevan | Oct. 31, 1939 |
| 2,228,017 | Pecker | Jan. 7, 1941 |
| 2,246,224 | Streander | June 17, 1941 |
| 2,293,028 | Fischer | Aug. 18, 1942 |
| 2,330,542 | Barnebl et al. | Sept. 28, 1943 |
| 2,340,132 | McHugh et al. | Jan. 25, 1944 |
| 2,344,355 | Harms | Mar. 14, 1944 |